Nov. 30, 1965     H. C. ELLINGSON     3,220,435
APPARATUS FOR METERING A MEDICANT INTO STOCK WATERING SYSTEM
Filed March 7, 1963     2 Sheets-Sheet 1
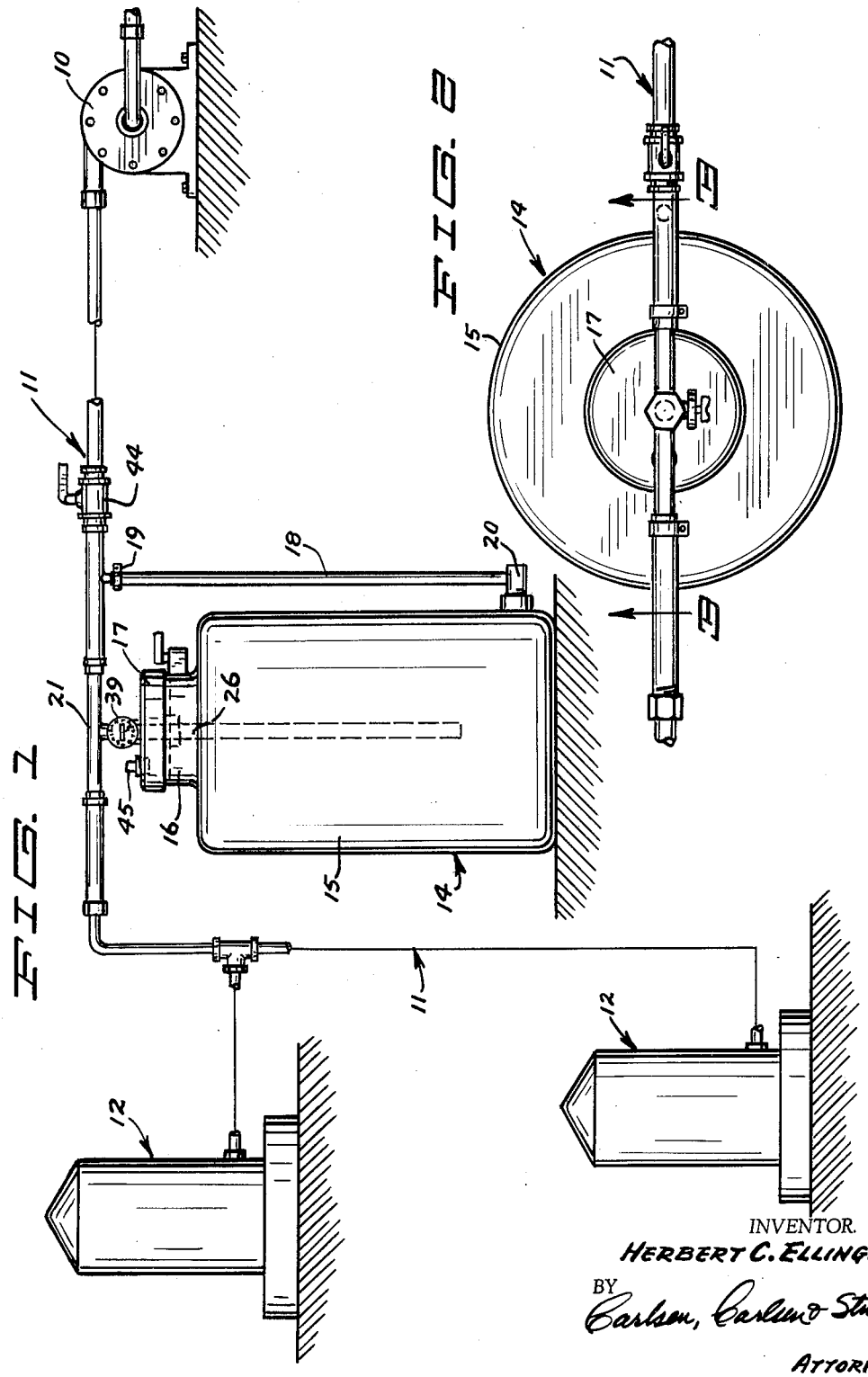
INVENTOR.
HERBERT C. ELLINGSON
BY Carlsen, Carlsen & Sturm
ATTORNEYS

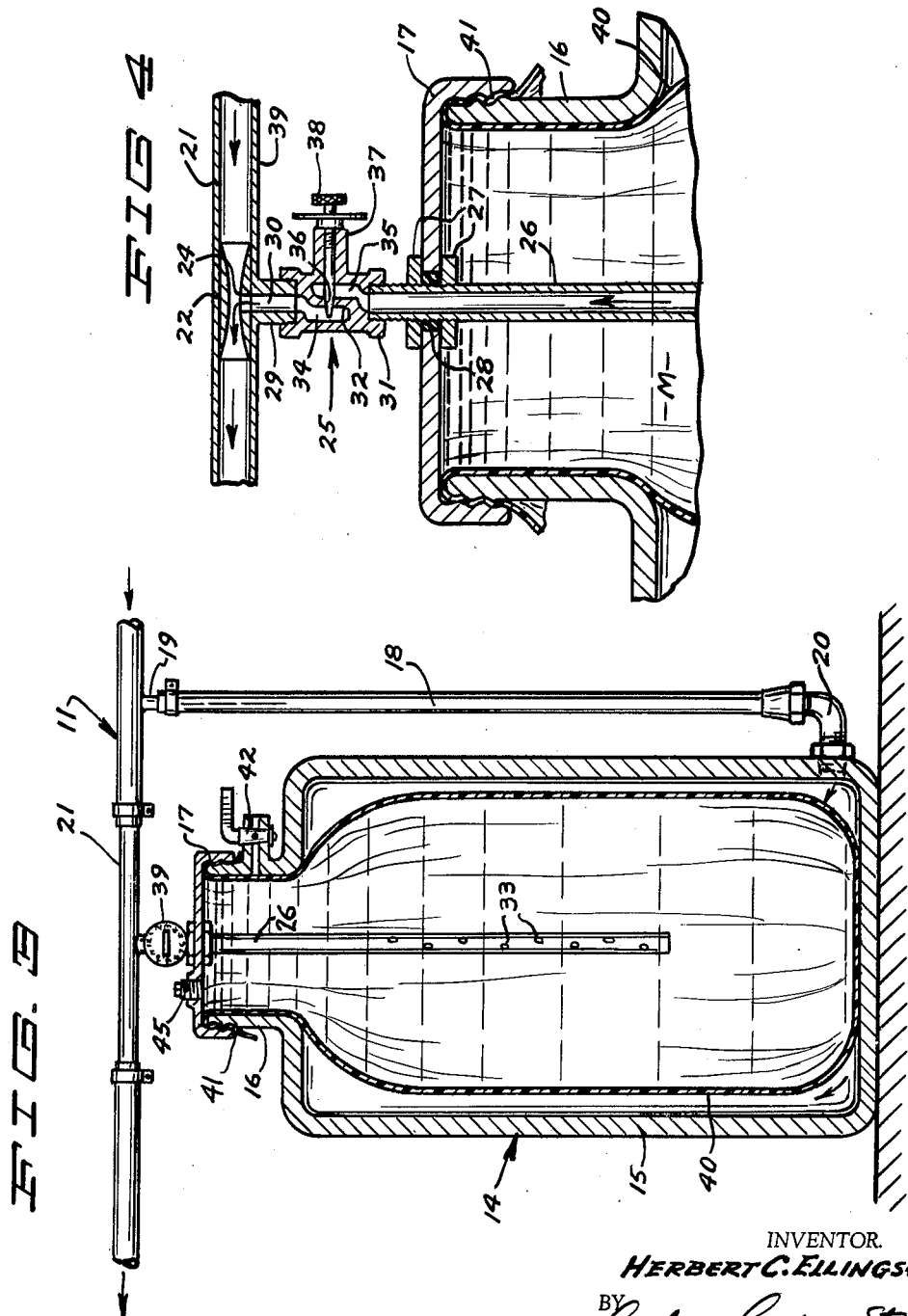

United States Patent Office 3,220,435
Patented Nov. 30, 1965

3,220,435
APPARATUS FOR METERING A MEDICANT INTO STOCK WATERING SYSTEM
Herbert C. Ellingson, Rte. 2, Benson, Minn.
Filed Mar. 7, 1963, Ser. No. 263,616
1 Claim. (Cl. 137—564.5)

This invention relates generally to systems for providing water to livestock and poultry and more particularly concerns an apparatus for dispensing liquid medicants into said systems in predetermined percentages.

It is a common practice in the raising of livestock and poultry to use the stock watering system as a carrier for medicants administered for the prevention of diseases. One difficulty heretofore has been the want of a device for automatically metering the medicant into the system at a constant predetermined medicant-to-water ratio.

An object of the present invention is to provide a livestock or poultry watering system having a supply line leading to one or more watering stations with a means for automatically dispensing a medicant into the supply line in predetermined ratios.

Another object of the invention is to provide an apparatus for attachment to the supply line of a stock watering system which will automatically meter any desired liquid medicant into the line with the apparatus being operated by the pressure in the supply line.

Still another object of the invention is to provide an apparatus for automatically dispensing a medicant into a stock watering system and having adjustment means for readily varying the percentage of medicant to be dispensed into the system.

With these and other objects in view the invention broadly comprises a single supply line for supplying water under pressure to one or more stock watering stations, a tank member of rigid material, an inlet line and an outlet line each connecting the supply line to the tank, and a medicant container of liquid tight flexible material disposed within the tank and opening only through said outlet line.

The above mentioned and still additional objects of the invention will be brought to light during the course of the following specification, reference being made to the accompanying drawings, in which:

FIG. 1 is a schematic view of a poultry watering system embodying the medicant dispensing apparatus and showing the apparatus in side elevation.

FIG. 2 is a plan view of the dispensing apparatus as attached to the water supply line.

FIG. 3 is a vertical section through the apparatus taken along line 3—3 of FIG. 2 and showing the medicant container or bag in uncollapsed condition.

FIG. 4 is an enlarged fragmentary section taken through the outlet line connection between the supply line and tank and showing the metering valve.

Referring now more particularly to the drawings, reference characters will be used to denote like parts or structural features in the different views. A poultry watering system is shown schematically in FIG. 1 with a pump 10 located in the supply line 11 to draw water from a suitable source and pump it to the conventional watering fonts 12. The on-and-off operation of the pump may be controlled by level indicators such as floats in the fonts 12.

The metering device for admitting a medicant into the line 11 is designated generally by the numeral 14. It includes an open mouthed tank or container 15 of stiff plastic or other rigid material having an externally threaded neck 16 at its upper open end upon which is screwed a removable cap 17. A fluid inlet line 18 has its upper end connected to line 11 as at 19 and its lower end connected to the interior of the container through a connector 20.

Line 11 is provided with a section 21, shown in cross section in FIG. 4. This section has a restriction piece 22 mounted therein which provides a venturi passage 24. An assembly designated generally at 25 provides an open tank outlet connection between the interior of the tank 15 and the venturi passage 24. This assembly will now be described in detail with reference being made particularly to FIG. 4.

An outlet tube 26 extends through a central opening in the top member 17. The tube is held in place by the opposing internally threaded members 27 which are threaded on the upper portion of the tube with an annular gasket 28 disposed therebetween to seal the top opening around the tube. A connector neck 29 is integrally mounted on section 21 to extend downwardly. This neck has an internal passage 30 communicating with the venturi passage 24.

The neck 29 and the upper end of tube 26 are interconnected by an annular valve housing 31 which has its upper and lower ends respectively threaded on the connected members. The housing 31 is provided with an internal partition 32 which divides the valve housing interior into side by side chambers 34 and 35 which respectively communicate with passage 30 and the interior of tube 26. The partition is provided with a circular port 36 which is horizontally aligned with a tubular internally threaded boss 37 mounted on the side of the valve housing. A needle valve member 38 having a cross head at one end and a tapered point at the other is threaded in the boss 37 for longitudinal adjustment therein so that the pointed end might vary the open area of the port 36. A gauge 39 having circularly arranged indicia is mounted on the boss so that the relative position of the cross head will indicate the size of the port opening. It will thus be understood that the opening between chambers 34 and 35 may be readily adjusted by turning the needle valve 38.

A collapsible open mouthed bag 40 of fluid tight flexible material is disposed within the housing 15 with the open end up. The bag portions 41 surrounding the opening therein are peripherally clamped between the container neck 16 and the top member 17 as the top is threaded thereon, as best shown in FIG. 4. The interior of the bag 40 thus opens only into the tube 36.

A manually operable runoff valve 42 is mounted on the neck 16 and a valve 44 is mounted in line 11. The cover 17 is also provided with a medicant drain or admission plug 45 (FIG. 3).

Operation of the structure will now be described in detail. Water is pumped by pump 10 from the water supply source through line 11 toward the fonts 12. A portion of the water under pressure will pass through line 18 into the housing 15. The water in line 11 passing beyond the line 18 will pass through the section 21 and venturi 24 creating a negative pressure in the passage 30, housing 25 and tube 26. As the tank 14 fills with water which cannot escape, the valve 42 being closed, or nearly closed, the water pressure on the bag 40 will force a portion of the medicant in the bag outwardly through the tube 26, port 36, passage 30 and into the main water stream. Valves 38 and 42 are adjusted so that the desired ratio of medicant to water is obtained and maintained with continued operation of the system. Valve 42 may be opened or partially opened to reduce internal tank pressure. Valve 38, on the other hand, may be adjusted to vary the open area of port 36.

Tube 26 is preferably provided with spaced apertures 33 along its length through which the medicant may enter the tube. The plurality of apertures is to prohibit closure of the tube from the medicant entry by collapsing of the bag 40 thereagainst.

Operation is continued until bag 40 has reached a collapsed condition having expelled virtually all of the medicant therefrom into the water system. The bag may be refilled by shutting off the system at valve 44 relieving pressure from the tank and then removing plug 45 or the cap 17 to admit the medicant through the open top of the bag.

While the invention is designed primarily for stock watering, it will be understood that the system and its metering device are also readily adapted for use in a spraying system for spraying insects or weeds, distributing liquid fertilizer or the like with the chemical to be diluted being initially placed in the bag 40.

The invention accordingly economically and effectively carries out the aforementioned objectives. It is understood that suitable modifications may be made in the structure as disclosed, provided such modifications come within the spirit and scope of the appended claims. Having now therefore fully illustrated and described my invention, what I claim to be new and desire to protect by Letters Patent is:

In an apparatus for dispensing medicant into the water flow supply line of a stock watering system, a tank having an open end, a cover adapted to be mounted on the tank in closing relation over the open end, a bag of collapsible fluid-tight material for holding a liquid medicant disposed within the tank and having its open end peripherally sealed between the cover and tank so that the inside of the bag is exposed only to the cover, a medicant outlet tube extending through the cover and having a substantial length thereof disposed within the bag, said substantial length of the outlet tube having perforations spaced therealong for passage of medicant from the bag into the tube, conduit means for connecting the outlet tube outside of the cover to the supply line, said conduit means including a needle valve for adjusting the size of the passage through the conduit means, a tank inlet line connecting the interior of the tank with the supply line upstream of the conduit means connection therewith for admitting water from the line into the tank and around the outside of the bag to create a collapsing pressure upon the bag to force the medicant therein through the perforations into the outlet tube, an outlet port in the tank open to atmosphere, an adjustable valve in the outlet port for adjusting the port opening to increase or decrease the bag collapsing pressure within the tank by allowing escape of water therein to atmosphere and correspondingly increasing or decreasing the flow through the supply line, whereby through combined adjustment of the needle valve and adjustable valve an infinite number of medicant to water ratios and flows per minute through the line below the conduit can be achieved from a constant uniform liquid supply in the line above the inlet line connection.

References Cited by the Examiner

UNITED STATES PATENTS

| | | | |
|---|---|---|---|
| 967,450 | 8/1910 | Sholes | 137—564.5 |
| 1,040,712 | 10/1912 | Lutenegger | 137—556.6 |
| 2,033,427 | 3/1936 | Guildford | 137—564.5 |
| 2,571,424 | 10/1951 | Dailey | 137—564.5 XR |
| 2,865,388 | 12/1958 | Sternbergh | 137—564.5 |
| 2,932,317 | 4/1950 | Klosse | 137—564.5 |
| 3,084,712 | 4/1963 | Brown | 137—564.5 |

M. CARY NELSON, *Primary Examiner.*